: US008496222B2

United States Patent
Li

(10) Patent No.: US 8,496,222 B2
(45) Date of Patent: Jul. 30, 2013

(54) BRACKET COORDINATING DEVICE

(75) Inventor: Zhitao Li, Zhongshan (CN)

(73) Assignee: Steelmate Co., Ltd, Dongfeng Town Zhongshan, Guangdong (CN)

(*) Notice: Subject to any disclaimer, the term of this patent is extended or adjusted under 35 U.S.C. 154(b) by 56 days.

(21) Appl. No.: 13/142,468

(22) PCT Filed: Jul. 30, 2010

(86) PCT No.: PCT/CN2010/075576
§ 371 (c)(1),
(2), (4) Date: Jun. 28, 2011

(87) PCT Pub. No.: WO2012/006791
PCT Pub. Date: Jan. 19, 2012

(65) Prior Publication Data
US 2012/0097813 A1 Apr. 26, 2012

(30) Foreign Application Priority Data
Jul. 13, 2010 (CN) .......................... 2010 1 0225530

(51) Int. Cl.
*A45D 42/14* (2006.01)

(52) U.S. Cl.
USPC ...................... 248/683; 248/205.5; 248/205.6; 248/205.7

(58) Field of Classification Search
USPC ............ 248/683, 205.5, 205.7, 205.6, 205.8, 248/206.1, 206.2
See application file for complete search history.

(56) References Cited

U.S. PATENT DOCUMENTS

| 4,133,575 | A | * | 1/1979 | Mader | ........................ 296/95.1 |
| 5,961,087 | A | | 10/1999 | Lee | |
| 6,814,335 | B2 | * | 11/2004 | Immerman | .................... 248/304 |
| 6,913,232 | B2 | | 7/2005 | Richter | |
| 7,628,362 | B2 | * | 12/2009 | Song | ........................ 248/205.8 |
| 7,635,111 | B2 | * | 12/2009 | Hara et al. | ................. 248/205.8 |
| 7,661,638 | B2 | * | 2/2010 | Yu | .............................. 248/205.8 |

(Continued)

FOREIGN PATENT DOCUMENTS

| CN | 2826052 Y | 10/2006 |
| CN | 2898412 Y | 5/2007 |
| CN | 201196184 Y | 2/2009 |
| GB | 2438626 A | 12/2007 |

OTHER PUBLICATIONS

International Search Report dated Apr. 21, 2011 for Application No. PCT/CN2010/075576.

*Primary Examiner* — Amy J Sterling

(57) ABSTRACT

A bracket coordinating device includes a rubber disc having a bottom surface capable of being fitted with a curved or planar surface, a compressing disc disposed on the rubber disc in a manner facing a top surface of the rubber disc, and an actuation device, a shaft member being connected on the top surface of the rubber disc vertically, a through hole being defined in a central portion of the compressing disc for passage of the shaft member, the actuation device being capable of driving the shaft member to move axially so as to make the compressing disc compress or be separated from the rubber disc. A resilient rubber member is sandwiched between the rubber disc and compressing disc to store elastic potential energy when it is compressed axially so as to counteract the compressing force. The bracket coordinating device of the invention has simple construction, reliable connection, wide application, and extended lifespan. In addition, the bracket coordinating device of the invention can withstand high temperature.

9 Claims, 4 Drawing Sheets

U.S. PATENT DOCUMENTS 7,665,706 B2   2/2010   Chien et al.
7,690,609 B2 *  4/2010   Akai et al. ................. 248/205.5
7,850,133 B2 * 12/2010   Carnevali ................... 248/205.5
2007/0023594 A1 *  2/2007   Choi et al. ................. 248/205.5

* cited by examiner

BRACKET COORDINATING DEVICE

CROSS REFERENCE TO RELATED APPLICATIONS

The present application is a national phase entry under 35 USC §371 of International Application No. PCT/CN2010/075576, filed Jul. 30, 2010, which claims the benefit of and priority to Chinese Patent Application No. 201010225530.8, filed Jul. 13, 2010, the entire disclosures of which are incorporated herein by reference.

FIELD OF THE INVENTION

The invention relates to a holding bracket for being absorbed onto a planar or curved surface so as to carry other objects thereon and more particularly, relates to a bracket coordinating device used therefor.

BACKGROUND

The construction of a holding bracket is well known for an ordinary person of the mechanical technical field. There are numerous inventions and implementations relevant to the holding bracket disclosed in patents around the world. Some of such inventions are covered by several Chinese patents owned by the present applicant.

Though the holding bracket is a widely used product, the progress of pursuing continuous improvement on the product never stops. A commonly used holding bracket is generally constructed of a rubber base disc and a hard compressing disc. A shaft member is disposed on the back portion of the base disc, and means for pulling the shaft member is equipped on the middle portion of the compressing disc. When assembling, the base disc is pressed against a flat surface to get rid of air as much as possible from the base disc, and then the compressing disc is pressed downwardly upon the base disc. Thereafter, the shaft member mounted on the base disc is drawn from the base disc. In turn, with the movement of the shaft member, the middle region of the base disc is raised by pulling action of the shaft member. At the same time, the rim of the base disc is compressed downwardly by the compressing disc. As a result, the volume underneath the base disc is increased and therefore, the pressure inside the volume is decreased, thus leading to vacuum. As ambient air pressure is larger than that inside the volume, the base disc is securely pressed against the flat surface. Excellent connection reliability may be achieved when the above construction is applied to flat glass.

The typical construction described above is mostly applied in automobile glasses. A series of products produced by the inventor has the similar construction and has been used by many other manufacturers. However, the inventor is always seeking for improvement upon the above construction.

In actual instances, the windshield of a car is not absolutely a plane. Rather, it is a curved surface with certain curvature. Though rubber base disc is somewhat resilient, the curvature, weight of the bracket itself, and weight of devices loaded on the bracket, will comprehensively cause uneven distribution of the absorbing forces applied to the curved surface by the base disc, thus resulting in some portions between the base disc and compressing disc being detached from each other, while other portions still being fixed with each other. It can be found by essential analysis that due to total weight of the compressing disc, bracket and devices loaded on the bracket, the force applied by the compressing disc onto the base disc and windshield is large on a lower portion along a direction perpendicular to the ground, thereby the compressing disc being fixedly secured onto the base disc. Comparatively, on an upper portion, the compressing disc is kept a slight distance away from the base disc because of weight of the compressing disc itself. In other words, in the upper portion, the compressing disc fails to be pressed firmly against the base disc. Accordingly, the base disc is susceptible to dropping off with time going by.

Due to the very nature of the curved surface, it is hard to reliably secure the base disc onto the curved surface especially when the curvature is large. For example, when the curvature is large, it will be more difficult for the base disc to uniformly contact the curved surface. This case can be compared with contacting between an absolute planar glass and an inner wall of a trumpet.

It is therefore demonstrated that curvature of the surface, total weight of the bracket and devices loaded thereon each have adverse influence on connection reliability between the bracket and windshield.

Another issue relates to connection reliability under high temperature. It is noted that high temperature when used in the following context expresses a relative concept. It is well known that rubber material becomes softened when subject to high temperature. When the bracket is in actual use, the middle portion thereof will be pulled by the shaft member and in turn, deformation occurs to the middle portion. In normal cases, the middle portion of the base disc is capable of returning to its original shape once the pulling force disappears. However, when subject to high temperature for a long period, the returning ability of the middle portion will be weakened. In other words, eternal deformation will occur to the middle portion and as a result, when pulling the shaft member at a later time, the room defined between the base disc and windshield will be reduced. In this case, pressure inside the room gets no less than ambient pressure and therefore, the bracket will lose its retention ability. In hot summer and when parked outdoors, high temperature may be easily caused inside the sealed driving cab of a car, and high temperature leads to short lifespan of the bracket.

Accordingly, it is desired to make improvement upon prior art bracket.

SUMMARY OF THE INVENTION

The object of the invention is to provide a bracket coordinating device which can lead to more reliable connection between a mounting bracket and curved surface, more uniform connection between a base disc of the bracket and the curved surface, as well as extended lifespan of the bracket even exposed in high temperature environment for a long time.

To obtain the above object, a bracket coordinating device is provided, which includes a rubber disc having a bottom surface capable of being fitted with a curved or planar surface, a compressing disc disposed on the rubber disc in a manner facing a top surface of the rubber disc, and an actuation device, a shaft member being connected on the top surface of the rubber disc vertically, a through hole being defined in a central portion of the compressing disc for passage of the shaft member, the actuation device being capable of driving the shaft member to move axially so as to make the compressing disc compress or be separated from the rubber disc. A resilient rubber member is sandwiched between the rubber disc and compressing disc to store elastic potential energy when it is compressed axially so as to counterbalance compressing force.

Preferably, the resilient rubber member is circular.

According to an embodiment of the invention, the resilient rubber member is formed integrally with the rubber disc.

According to an embodiment of the invention, a top surface of the resilient rubber member faces the compressing disc; a circular ridge is formed on the top surface of the resilient rubber member; corresponding to the circular ridge, a circular groove is defined on the compressing disc; and the ridge of the resilient rubber member engages the groove of the compressing disc.

According to an embodiment of the invention, a top surface of the resilient rubber member faces the compressing disc; a circular ridge is formed on the top surface of the resilient rubber member; corresponding to the circular ridge, a circular groove is defined on the compressing disc; and the ridge of the resilient rubber member engages the groove of the compressing disc.

The circular ridge can be exchanged with the circular groove.

A tongue is provided on a peripheral portion of the rubber disc, and the tongue is formed integrally with the rubber disc. This helps detaching with ease the rubber disc away from the planar or curved surface.

The resilient rubber member has a circular base portion and a tower portion extended and raised from an internal circumference of the circular base portion; a through hole is defined in a central portion of the tower portion for passage of the shaft member; and the tower portion and compressing disc each have a surface, the two surfaces being facing each other and consistent with each other in shape.

The hardness of the resilient rubber member is smaller than that of the rubber disc.

The bracket coordinating device of the invention has simple construction, reliable connection, wide application, and extended lifespan. In addition, the bracket coordinating device of the invention can withstand high temperature.

Other advantages and novel features will be drawn from the following detailed description of embodiments with attached drawings, in which:

DETAILED DESCRIPTION

Now, various embodiments of the invention will be discussed below in greater detail in conjunction with the accompanying drawings.

Figure 1:
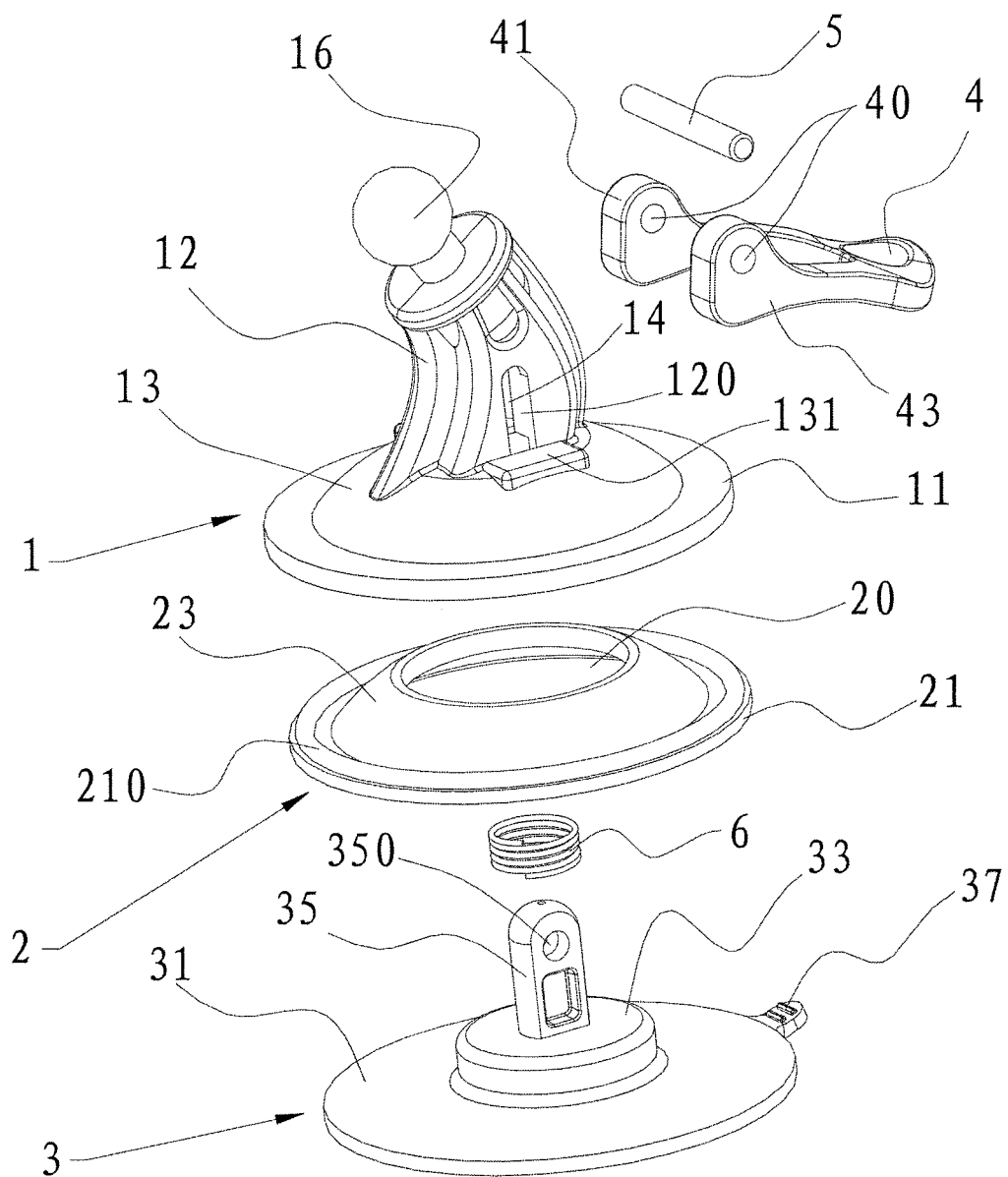
FIG. 1 shows an exploded perspective view of a bracket coordinating device according to an embodiment of the invention.
Figure 2:
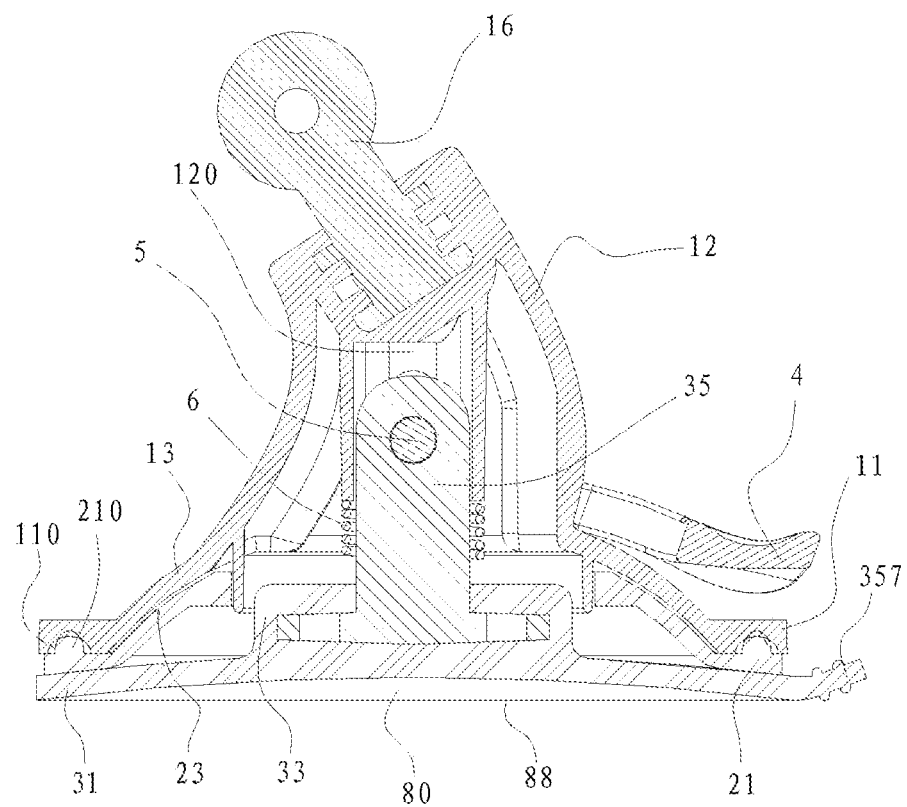
FIG. 2 shows an assembled and cross-sectional view of the bracket coordinating device of FIG. 1 taken along a vertical axial direction.

FIGS. 1, 2 show a bracket according to an embodiment of the invention. Only part related to connection with a planar or curved surface (as denoted by numeral 88 of FIG. 2), of the bracket is shown, while other part such as connection members corresponding to a gimbal joint 16 of a chassis 12 and the devices carried on the bracket are not shown in drawings.

The bracket coordinating device of the invention is embodied as the bracket shown in FIGS. 1 and 2. The coordinating device includes a compressing disc 1, a resilient rubber member 2, a rubber disc 3, and an actuation device which is shown collectively by reference numerals 4, 5 and 6.

Mounted on a top portion of the compressing disc 1 is a chassis 12 which is provided on one hand to install the actuation device thereon and on the other hand to carry other connective members thereon so as to load corresponding equipments thereon thanks to its particular shape. Therefore, the external shape of the chassis 12 will not have limit to the implementation of the invention. However, the internal construction of the chassis 12 must be adapted to the specific construction of the actuation device in order to ensure that the actuation device will work properly. It is well known that some flexibility exists in engagement between the construction of the chassis 12 and that of the actuation device and accordingly, in the following embodiment, only one specific construction will be discussed.

The rubber disc 3 is a resilient component made of plastic such as rubber, and is of a pie shape. The rubber disc 3 has a bottom surface smooth enough to engage a planar or curved surface such as glass, and a top surface where a cylindrical protrusion 33 is formed integrally with the rubber disc 3. A shaft member 35 is disposed on the rubber disc 3 along its axial direction. One end of the shaft member 35 is inserted in and held by the protrusion 33, whereas the other end thereof is extended along the axial direction upon the rubber disc 3 (i.e., the protrusion 33). The shaft member 35 takes a cubic shape with the purpose of prevention itself from being rotated relative to a chamber 14 with the help of corners of the cubic construction. An internal pivoting hole 350 is defined in the top portion of the shaft member 35 along its thickness direction. A pin 5 may be inserted into and engage with the internal pivoting hole 350 so as to form a hinged relation between the hole 350 and pin 5. A tongue 37 is provided on the rubber disc 3 on its peripheral portion 31. The tongue 37 may be operated by user so as to make the rubber disc 3 being separated from a planar or curved surface.

The resilient rubber member 2 is made of silica gel or other material and has hardness lower than the rubber disc 3 so that the resilient rubber member 2 becomes relatively soft and has better resiliency. The resilient rubber member 2 is constructed of a circular base portion 21 located at the circumferential portion of the rubber member 2 and a circular tower portion 23 located at the central portion of the rubber member 2. The circular base portion 21 has a bottom surface which is designed to be smooth so as to firmly engage a top surface of the rubber disc 3 located below the circular base portion 21. The circular base portion 21 also has a top surface on which a circular ridge 210 is formed and extended above the surface of the circular base portion 21. The circular ridge 210 may be snapped into a circular groove 110 defined in the bottom surface of the compressing disc 1, thereby realizing secure fit between the compressing disc 1 and resilient rubber member 2. The circular tower portion 23 is formed integrally with the circular base portion 21 and tapered from bottom to top thereof, thus forming a tower shape. The bottom peripheral region of the tower portion 23 abuts on the internal periphery of the circular base portion 21. In addition, a through hole 20 is defined in the top of the tower portion 23. Though not necessary, the tower design is preferable for maintaining stable coupling between the resilient rubber member 2 and compressing disc 1.

The compressing disc 1 is of a lid shape and includes a circular portion 11 located at the periphery of the disc 1 and a circular cover portion 13 located at the central portion thereof and integral with the circular portion 11. The bottom surface of the circular portion 11 is planar and has a circular groove 110 defined therein and corresponding to the circular ridge 210 of resilient rubber member 2. The groove 110 may be fitted into the ridge 210 so that the resilient rubber member 2 is compressed by the compressing disc 1 better. The bottom of the circular cover portion 13 conforms to the external contour of the circular tower portion 23 of the member 2 in order that the resilient rubber member 2 is fixed in place. A through hole (not labeled) is defined in the top of the circular cover portion 13, engages the chassis 12, and extends into the top of the chassis 12. Consequently, a longitudinal chamber 14 is formed inside the chassis 12. The shaft member 35 formed on the central protrusion 33 of the top of the rubber member 3 may be inserted into the chamber 14. An external pivoting hole 120 is defined horizontally in the top portion of the chassis 12 and passes through the top portion of the chamber 14. The external pivoting hole 120 may be aligned with the internal pivoting hole 350 of the shaft member 35 when the shaft member 35 is received inside the chamber 14, thereby a pin 5 being able to be received into the both holes 120 and 350. To allow a slight movement of the pin 5 along axial direction of the bracket when received into the external pivoting hole 120, the hole 120 is designed to have a longitudinal structure. Furthermore, the longitudinal direction of the hole 120 is consistent with the axial direction of the compressing disc 1.

The actuation device in this embodiment particularly includes a handle 4, a pair of supporting projections 131, a pin 5 and a cylindrical spring 6. The two supporting projections 131 are made of two symmetric extrusions formed on the circular cover portion 13 of the compressing disc 1. The two supporting projections 131 are located at two sides of the internal pivoting hole 350 respectively. The handle 4 includes two arms 41 and 43, each of which has an axial hole 40. The two axial holes 40 are coaxial with each other. The handle 4 is configured in such manner that when the pin 5 reaches the uppermost position of the external pivoting hole 120, the first lower positions of the arms 41 and 43 are pressed against the two supporting projections 131 respectively. In this situation, the handle 4 functions to maintain relative location between the shaft member 35 and compressing disc 1 in a first state. Similarly, when the pin 5 reaches the lowermost position of the external pivoting hole 120, the second lower positions of the arms 41 and 43 are pressed against the pair of supporting projections 131 respectively. In this situation, the handle 4 serves to maintain the relative location between the shaft member 35 and compressing disc 1 in a second state. In the first state, the shaft member 35 is close to the top position of the chamber 14 of the chassis 12. The central protrusion 33 of the rubber disc 3 is pulled upwardly. The peripheral portion 31 (the main body) of the rubber disc 3 is pressed and limited by the circular portion 11 of the compressing disc 1 and accordingly, only the central protrusion 33 is raised above the peripheral portion 31 of the disc 3. In this case, the rubber disc 3 is deformed and then the bracket is fixed to other object (that is, the rubber disc 3 is tightly attached to the planar or curved surface). In the second state, the shaft member 35 is moved to the bottom position of the chassis 12, and the central protrusion 33 begins to return to its original location relative to the peripheral portion 31 of the rubber disc 3. At this time, the bracket is in a disconnected condition. To make it easy for the actuation device to transit between the first and second states, the cylindrical spring 6 is sleeved outside the shaft member 35.

The actuation device may be implemented with certain flexibility. Especially, the shape of the actuation device may be designed freely. The detailed construction of the actuation device will be illustrated in the following context.

When in assemble process, as shown in FIG. 2, the cylindrical spring 6 is sleeved on the shaft member 35. The resilient rubber member 2 is disposed on the rubber disc 3. Then, the compressing disc 1 is disposed on the resilient rubber member 2. The shaft member 35 formed on the top position of the rubber disc 3 passes through the through hole 20 of the rubber member 2 and is extended into the chamber 14 of the chassis 12. The axial holes 40 of the handle 4 are aligned with the internal pivoting hole 350 of the shaft member 35. The pin 5 travels across the axial holes 40, the external pivoting hole 120 and the internal pivoting hole 350 and then the both ends of the pin 5 are held in place. As a result, the handle 4 is forced against the two supporting projections 131, thus forming a bracket coordinating device of the invention.

When transiting to the first state, that is, when the bracket is mounted on a planar or curved surface, driven by the handle 4, the central protrusion 33 of the rubber disc 3 will be raised with the movement of the shaft member 35. Correspondingly, the compressing disc 1 will be urged downwardly axially and this will result in tight contact of the resilient rubber member 2 and rubber disc 3 with the planar or curved surface. The space 80 underneath the rubber disc 3 is inflated, thus leading to vacuum or extremely low pressure inside the space. The relative location between the compressing disc 1 and rubber disc 3 is kept by the handle 4. The force imposed by the handle 4 and air pressure are applied axially to the compressing disc 1. In turn, the compressing disc 1 pushes the resilient rubber member 2 and rubber disc 3 such that the rubber disc 3 is pressed against the planar or curved surface. In this instance, though partial region (away from the gravity center) of the compressing disc 1 is distanced from the disc 3 and other region (close to the gravity center) is tightly attached to the disc 3 due to tilt of the compressing disc 1 toward the gravity center caused by total weight of the bracket mounted the curved windshield of the car and the electronic apparatus loaded on the bracket, the resilient rubber member 2 is compressed here and therefore stores elastic potential energy which has the function of buffering and coordinating the bracket. Specifically, due to the resiliency of the rubber member 2, it may provide sufficient axial elastic force when being compressed axially so as to counteract the compressing force. By this manner, region of the rubber member 2 where large compressing force is applied will be thinned, and to the maximum extent, the distance between the compressing disc 1 and rubber disc 3 will be kept within a predefined range. Comparatively, region of the rubber member 2 where less even no compressing force is applied will be kept unchanged in thickness, thus compensating large distance deviation between the disc 1 and disc 3. Therefore, connection between the compressing disc 1 and rubber disc 3 is further enhanced by coordination of the resilient rubber member 2. This connection will be maintained more stable without any loosening therebetween.

Though a curved surface of certain curvature may result in irregular deformation of the rubber disc 3 when the disc 3 is attached thereon, thus making the bottom and top surface of the disc 3 no more a regular planar surface, elasticity of the resilient rubber member 2 has the balance function herein. Concretely, when the compressing disc 1 pushes the member 2, partial relative recessed region of the disc 3 caused by the curved surface will be compensated by the resilient rubber member 2. With regard to raised region of the disc 3 caused by the curved surface, it will also be compensated by compressing the member 2 by the bottom surface of the disc 1 such that some region of the member 2 becomes thinned. In a summary, application of compressing force by the disc 1 to the member 2 can result in a surface which is exactly conformed to the contour of the bottom surface of the disc 1, thus making the force imposed on the curved surface more uniform. This also helps enhancing connection reliability between the bracket and curved surface.

After the bracket is held on the planar or curved surface, the shaft member 35 will be pulled upwardly a certain distance under the control of the handle. Correspondingly, the central protrusion 33 will be also pulled upwardly a variable distance with respect to the peripheral portion 31 of the rubber disc 3. This variable distance may be influenced by the thickness of the member 2. Under normal temperature, the resilient rubber member 2 and rubber disc 3 will work based on their characteristic under normal temperature and in this condition, the height is relatively constant. The rubber disc 3 returns to its initial shape when it is detached from the planar or curved surface by releasing the shaft member 35 with the help of the handle. When subject to high temperature, the resilient rubber member 2 is easy to return to its initial shape, while it is difficult for the rubber disc 3 to return to its initial shape due to deformation resulted from high temperature. Herein, the resilient rubber member 2 has the protective function though it is also softened because of heat. That is, thanks to the resiliency of the rubber member 2, a vacuum space 80 may also be formed even in high temperature, thus the compressing disc 1 may still be firmly attached to the rubber disc 3 (the peripheral portion 31 thereof) by the resilient rubber member 2. In this case, the bracket may be mounted properly onto the curved surface, and lifespan of the bracket is also extended.

Alternatively, the circular ridge 210 may also be formed on the bottom surface of the circular portion 11 of the compressing disc 1, while the circular groove 110 may also be formed on the top surface of the circular base portion 21 of the member 2.

Preferably, similar ridge 210/groove 110 may also be formed on the top surface of the peripheral portion 31 of the disc 3, whereas the corresponding groove 110/ridge 210 may be defined on the bottom surface of the circular base portion 21 of the member 2, thus enhancing the reliable connection between the disc 3 and member 2.

To simplify the entire construction of the bracket, the rubber member 2 and disc 3 may be formed integrally by plastic injection molding process. In this case, due to integrity of the member 2 and disc 3, the tower portion 23 of the member 2 may be omitted herefrom.

Figure 3:
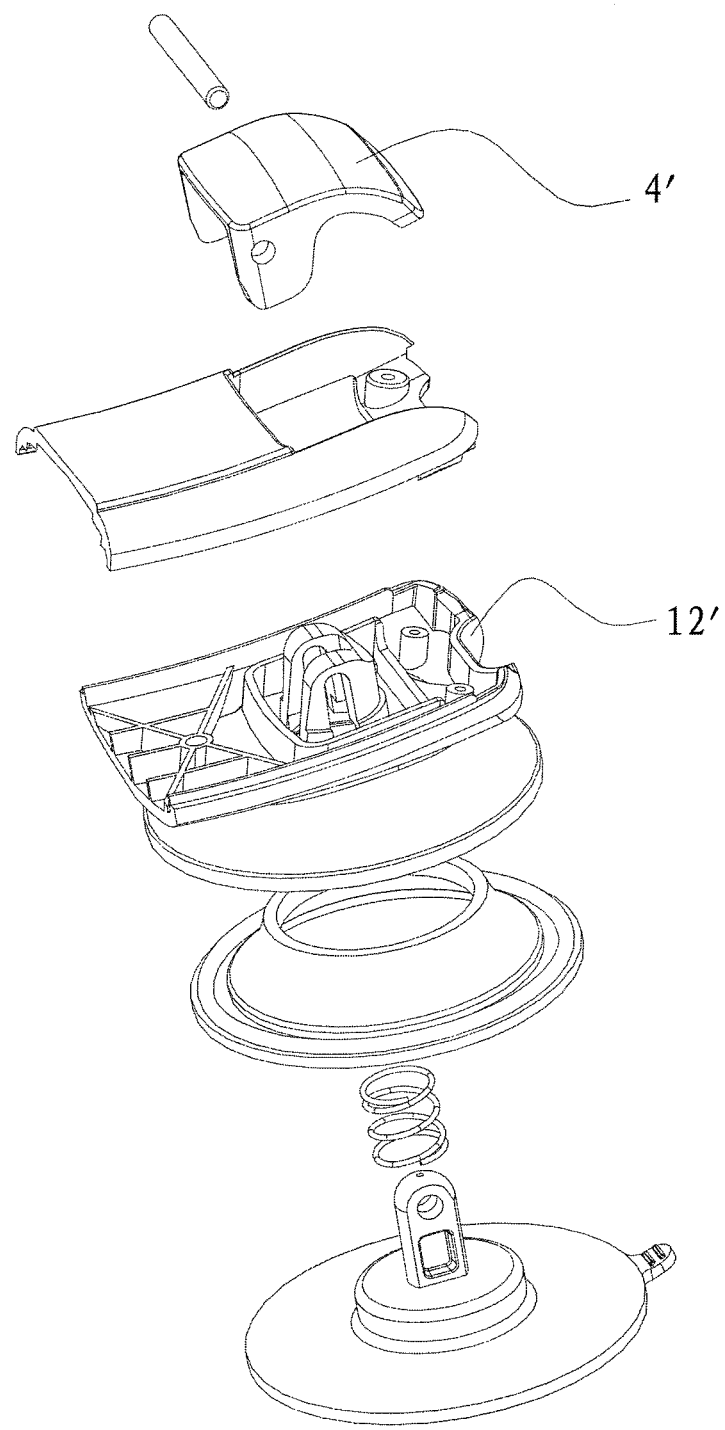
FIG. 3 shows an exploded perspective view of a bracket coordinating device according to another embodiment of the invention.
Figure 4:
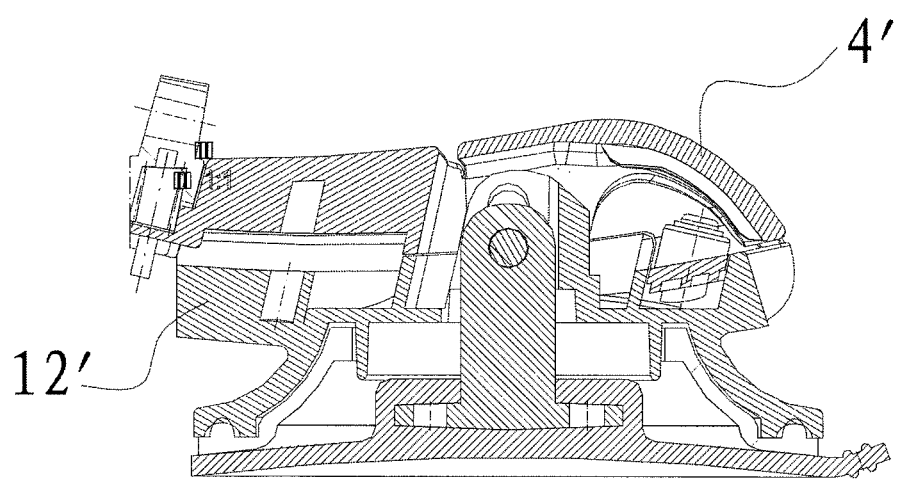
FIG. 4 shows an assembled and cross-sectional view of the bracket coordinating device of FIG. 3 taken along a vertical axial direction.

As described above, the handle 4 and chassis 12 of the actuation device may be designed with certain freedom. As shown in FIGS. 3 and 4 which shown together a bracket according to another embodiment of the invention, the bracket is similar in construction with the above embodiment except for the following differences.

Firstly, the shape of the chassis is different. The chassis 12' in this embodiment is configured to be a box which can be extended along its one lateral side to define means for carrying horizontally other equipment.

Secondly, the shape of the handle 4' is changed to adapt to the shape of the chassis 12'. However, they still have the same operation principle.

It is noted that the second embodiment may obtain the similar technical effects to the above embodiment. In addition, some features presented in the first embodiment may also be applied to this embodiment.

FIGS. 3 and 4 show together the chassis 12 with some part omitted.

Summarily, the bracket coordinating device of the invention has simple construction, reliable connection, wide application, and extended lifespan. In addition, the bracket coordinating device of the invention can withstand high temperature.

What is claimed is:

1. A bracket coordinating device, comprising a rubber disc having a bottom surface capable of being fitted with a curved or planar surface, a compressing disc disposed on the rubber disc in a manner facing a top surface of the rubber disc, and an actuation device, a shaft member being connected on the top surface of the rubber disc vertically, a through hole being defined in a central portion of the compressing disc for passage of the shaft member, the actuation device being capable of driving the shaft member to move axially so as to make the compressing disc compress or be separated from the rubber disc, wherein a resilient rubber member is sandwiched between the rubber disc and compressing disc to store elastic potential energy when it is compressed axially so as to counterbalance compressing force, wherein the resilient rubber member comprises a circular base portion and a tower portion extended and raised from an internal circumference of the circular base portion; a through hole is defined in a central portion of the tower portion for passage of the shaft member; and the tower portion and compressing disc each have a surface, the two surfaces being facing each other and consistent with each other in shape.

2. The bracket coordinating device according to claim 1, wherein the resilient rubber member is circular.

3. The bracket coordinating device according to claim 2, wherein the resilient rubber member is formed integrally with the rubber disc.

4. The bracket coordinating device according to claim 2, wherein a top surface of the resilient rubber member faces the compressing disc; a circular ridge is formed on the top surface of the resilient rubber member; corresponding to the circular ridge, a circular groove is defined on the compressing disc; and the ridge of the resilient rubber member engages the groove of the compressing disc.

5. The bracket coordinating device according to claim 3, wherein a top surface of the resilient rubber member faces the compressing disc; a circular ridge is formed on the top surface of the resilient rubber member; corresponding to the circular ridge, a circular groove is defined on the compressing disc; and the ridge of the resilient rubber member engages the groove of the compressing disc.

6. The bracket coordinating device according to claim 2, wherein a bottom surface of the resilient rubber member faces the rubber disc; a circular ridge is defined in the bottom surface of the resilient rubber member; corresponding to the ridge, a circular groove is defined in the rubber disc; and ridge of the resilient rubber member engages the groove of the rubber disc.

7. The bracket coordinating device according to claim 4, wherein the circular ridge can be exchanged with the circular groove.

8. The bracket coordinating device according to claim 1, wherein a tongue is provided on a peripheral portion of the rubber disc, and the tongue is formed integrally with the rubber disc.

9. The bracket coordinating device according to claim 1, wherein the hardness of the resilient rubber member is smaller than that of the rubber disc.

\* \* \* \* \*